US012518573B2

(12) United States Patent
Nalawade et al.

(10) Patent No.: US 12,518,573 B2
(45) Date of Patent: Jan. 6, 2026

(54) SUSPENSION SYSTEM FOR A HEAVY VEHICLE

(71) Applicant: Volvo Truck Corporation, Gothenburg (SE)

(72) Inventors: Dinkar Nalawade, Karnataka (IN); Mehul Shah, Indore (IN); Anish Sivankutty, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 196 days.

(21) Appl. No.: 18/494,904

(22) Filed: Oct. 26, 2023

(65) Prior Publication Data
US 2024/0153322 A1 May 9, 2024

(30) Foreign Application Priority Data
Nov. 3, 2022 (EP) ..................................... 22205402

(51) Int. Cl.
*G07C 5/02* (2006.01)
*B60K 31/00* (2006.01)
(Continued)

(52) U.S. Cl.
CPC ................ *G07C 5/02* (2013.01); *B60K 31/00* (2013.01); *G01D 5/14* (2013.01); *G01P 3/00* (2013.01);
(Continued)

(58) Field of Classification Search
CPC ........ G07C 5/02; G07C 5/0816; B60K 31/00; B60K 2031/0091; G01D 5/14; G01P 3/00;
(Continued)

(56) References Cited

U.S. PATENT DOCUMENTS 4,807,128 A * 2/1989 Ikemoto ............. B60G 17/0162
280/5.512
8,412,485 B2 4/2013 Brown
(Continued)

FOREIGN PATENT DOCUMENTS

DE 102018123082 A1 3/2020
DE 102019202428 A1 8/2020
(Continued)

OTHER PUBLICATIONS

English translation of Kim et al. (JP 2008030736) (Year: 2008).*
Extended European Search Report for European Patent Application No. 22205402.5, mailed Mar. 30, 2023, 5 pages.

*Primary Examiner* — Kyle J Kingsland
(74) *Attorney, Agent, or Firm* — Withrow & Terranova, PLLC (57) ABSTRACT

A suspension system for a heavy vehicle, the system comprising a control circuitry configured to compare signals on current vertical position obtained from left and right level sensors and determine whether a current difference in vertical position between left and right leaf springs is greater than first threshold value; if determined difference is greater than first threshold value: determine, based on timing information related to signals provided by inertial measurement unit and left and right level sensors, whether the determined difference in vertical position between left and right leaf springs is related in time with signal from inertial measurement unit indicating that the angular velocity of wheel axle is greater than a second threshold; and, if determined difference in vertical position not related in time with signal indicating angular velocity of wheel axle is greater than second threshold, generate alarm signal indicative of detected or possibly detected leaf spring failure.

15 Claims, 2 Drawing Sheets

(51) Int. Cl.
   *G01D 5/14* (2006.01)
   *G01P 3/00* (2006.01)
   *G07C 5/08* (2006.01)

(52) U.S. Cl.
   CPC .... *G07C 5/0816* (2013.01); *B60K 2031/0091* (2013.01)

(58) Field of Classification Search
   CPC ..... G01M 17/04; B60G 11/04; B60G 17/019; B60G 2200/31; B60G 2202/112; B60G 2204/11; B60G 2204/112; B60G 2300/026; B60G 2300/09; B60G 2400/0516; B60G 2400/0521; B60G 2400/252; B60G 2401/28; B60G 2600/02; B60G 2600/044; B60G 2600/08; B60G 2600/124; B60G 2800/80; B60G 17/0185
   See application file for complete search history.

(56) References Cited

U.S. PATENT DOCUMENTS

| | | |
|---|---|---|
| 11,305,602 B2 | 4/2022 | Du et al. |
| 2008/0121438 A1 | 5/2008 | Brown |

FOREIGN PATENT DOCUMENTS

| | | | | |
|---|---|---|---|---|
| JP | H06323894 A | 11/1994 | | |
| JP | 2008030736 A | * 2/2008 | ........... | B60G 17/016 |
| KR | 101440239 B1 | 10/2014 | | |
| KR | 20190073024 A | 6/2019 | | |
| KR | 102204868 B1 | 1/2021 | | |

* cited by examiner

SUSPENSION SYSTEM FOR A HEAVY VEHICLE

RELATED APPLICATIONS

The present application claims priority to European Patent Application No. 22205402.5, filed on Nov. 3, 2022, and entitled "SUSPENSION SYSTEM FOR A HEAVY VEHICLE," which is incorporated herein by reference in its entirety.

TECHNICAL FIELD

The disclosure relates to a vehicle suspension system provided with leaf springs. In particular the disclosure relates to detection of leaf spring failure. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle suspension system connects wheels/axles with a chassis/body of the vehicle and typically includes springs, shock absorbers and linkages of various types. Leaf springs are commonly used in suspension systems for heavy vehicles, such as trucks, mining dumpers and similar. Failure or break down of a leaf spring, for instance due to fatigue stress after months of driving on rough road surfaces, can have rather severe consequences since it may lead to damage of remaining leaf springs, disconnection of axle and chassis, lost vehicle control for a driver of the vehicle, etc., which in turn may lead to accidents or at least is likely to lead to time-consuming and costly repair work.

Consequences of leaf spring failure can be reduced by stopping or at least reducing the speed of a vehicle subject to leaf spring failure. However, it is often difficult to detect a leaf spring failure; a driver may not sense any unbalanced vehicle behaviour or similar during operation of the vehicle, and in e.g. dusty, dark, and noisy environments where the vehicle is more or less constantly in operation it may even be difficult to detect a leaf spring failure by inspection when the vehicle stands still, which it does only during short time periods.

There is thus a need for improvements with regard to detecting a leaf spring failure.

SUMMARY

According to a first aspect of the disclosure it concerns a suspension system for a heavy vehicle, the system comprising:
- a wheel axle configured to extend transversely across the vehicle and be connected to a pair of left and right wheels of the vehicle;
- a pair of left and right leaf springs connected to the wheel axle in association with a corresponding wheel; wherein each leaf spring is adapted to be connected also to a chassis of the vehicle so as to, while deflecting, allow relative vertical movement between the chassis and the wheel axle;
- an inertial measurement unit arranged at the wheel axle, wherein the inertial measurement unit is adapted to provide a signal indicative of a current angular velocity of the wheel axle about a longitudinal roll axis of the vehicle and thus to provide information on whether one of the wheels passes a significant bump on a road surface while driving the vehicle;
- left and right level sensors arranged to provide a signal indicative of a current vertical position of a corresponding leaf spring in relation to the chassis and thus to provide information on a degree of deflection of each of the left and right leaf springs when functioning as intended;
- a control circuitry configured to control the suspension system, wherein the control circuitry is configured to:
  compare the signals on current vertical position obtained from the left and right level sensors and determine whether a current difference in vertical position between the left and right leaf springs is greater than a first threshold value;
  if the determined difference is greater than the first threshold value:
    determine, based on timing information related to the signals provided by the inertial measurement unit and the left and right level sensors, whether the determined difference in vertical position between the left and right leaf springs is related in time with a signal from the inertial measurement unit indicating that the angular velocity of the wheel axle is greater than a second threshold;
  and, if the determined difference in vertical position is not related in time with the signal indicating that the angular velocity of the wheel axle is greater than the second threshold;
    generate an alarm signal indicative of a detected or possibly detected leaf spring failure.

The level sensors indicate the vertical position of the leaf springs (in relation to chassis) which corresponds to a degree of deflection of a well-functioning leaf spring. The level sensors cannot distinguish between a compressed well-functioning leaf spring located in a certain vertical position and a damaged leaf spring in the same position that has lost (part of) its stiffness or deflecting capacity. A large difference in vertical position/deflection degree between left and right leaf springs will occur if one of the leaf springs is damaged but also if one of the wheels, but not the other, passes a bump, which is common when the vehicle operates on rough roads. The inertial measurement unit monitors the angular velocity of the wheel axle about the vehicle roll axis of the vehicle, and this angular velocity will be significant if one of the wheels passes a bump. To avoid false alarm for leaf spring failure, it is checked whether there is a large angular velocity at the time when a large difference in vertical position has been determined, and if so it can be concluded that there is no leaf spring failure but instead a normal asymmetric deflection of well-functioning leaf springs. On the other hand, if there is no such large angular velocity at that point of time, it can be concluded that there is a (likely) leaf spring failure and an alarm signal can be triggered.

The generation of the alarm signal may include providing a light-alarm indication on an instrument panel or in other ways making sure that a driver of the vehicle becomes aware of a potential leaf spring problem so the driver can stop or slow down the vehicle. It may also include automatic measures, such as checking the speed of the vehicle and reduce the speed by applying a braking system if the speed is greater than a certain threshold speed. For both autonomous and manually operated vehicles the generation of the alarm signal may include automatically reducing the speed, possibly followed by automatically stopping the vehicle.

The control circuitry may form part of or be connected to a vehicle control system configured to control other components of the vehicle, such as driveline and braking system.

A general advantageous effect of a suspension system of the above type is that an early warning is provided regarding a damaged or at least possibly damaged leaf spring. It then becomes possible to immediately slow down and stop the vehicle so as to prevent loss of control of the vehicle and prevent damage of other leaf springs on the vehicle. In turn this provides for a reduced risk for accidents and reduced costs for repair work and shortened down time/service time.

A leaf spring failure detection system of the above type may be activated more or less continuously as long as the vehicle is activated. A leaf spring failure can thereby be detected immediately. Moreover, the system can be used to check leaf spring status under stationary conditions, indicate whether the vehicle is overloaded, and identify unbalanced weight on the vehicle.

What values to set for the first and second threshold mentioned above depends on e.g. the type and size of the vehicle and the particular design of the suspension system. As to the time relation between the determined difference in vertical position and the signal from the inertial measurement unit, various variants are possible. Timing information for signals in a modern control system is generally not an issue, i.e. it is generally known at what point in time a certain sensor signal is generated. One possibility is then to say that the signal from the inertial measurement unit (i.e. the signal indicating that the angular velocity is greater than the second threshold) should be within a certain time period before or after the point in time when it was determined that the difference in vertical position was greater than the first threshold value.

In an example, the suspension system further comprises left and right shock absorbers arranged to be compressed when the vertical distance between the chassis and the wheel axle decreases, wherein each left and right level sensor is integrated in the left and right shock absorber, respectively. The level sensors may form separate components and may be arranged in various ways. However, integrating the level sensors into the shock absorbers is advantageous since the shock absorbers are typically present anyway and since the sensors may be protected from impacts etc.

In an example, at least one of the left and right level sensor is an eddy current based linear position sensor.

In an example, the inertial measurement unit comprises an accelerometer, a gyroscope and/or a magnetometer.

In an example, each leaf spring has an elongated shape and extends in a direction substantially in parallel with the longitudinal roll axis of the vehicle.

According to a second aspect of the disclosure it concerns a vehicle comprising a chassis, a pair of left and right wheels and a suspension system for connecting the wheels and the chassis, wherein the suspension system comprises:

a wheel axle that extends transversely across the vehicle and that is connected at the end portions thereof to the left and right wheels;

a pair of left and right leaf springs connected to the wheel axle in association with a corresponding wheel, wherein each leaf spring is connected also to the chassis so as to, while deflecting, allow relative vertical movement between the chassis and the wheel axle and thereby also between the chassis and the wheels;

an inertial measurement unit arranged at the wheel axle, wherein the inertial measurement unit is adapted to provide a signal indicative of a current angular velocity of the wheel axle about a longitudinal roll axis of the vehicle and thus to provide information on whether one of the wheels passes a significant bump on a road surface while driving the vehicle;

left and right level sensors arranged to provide a signal indicative of a current vertical position of a corresponding leaf spring in relation to the chassis and thus to provide information on a degree of deflection of each of the left and right leaf springs when functioning as intended;

wherein the vehicle further comprises:

a control circuitry configured to control the suspension system, wherein the control circuitry is configured to:

compare the signals on current vertical position obtained from the left and right level sensors and determine whether a current difference in vertical position between the left and right leaf springs is greater than a first threshold value;

if the determined difference is greater than the first threshold value:

determine, based on timing information related to the signals provided by the inertial measurement unit and the left and right level sensors, whether the determined difference in vertical position between the left and right leaf springs is related in time with a signal from the inertial measurement unit indicating that the angular velocity of the wheel axle is greater than a second threshold;

and, if the determined difference in vertical position is not related in time with the signal indicating that the angular velocity of the wheel axle is greater than the second threshold, generate an alarm signal indicative of a detected or possibly detected leaf spring failure.

In an example of the vehicle, the suspension system further comprises left and right shock absorbers arranged to be compressed when the vertical distance between the chassis and the wheel axle decreases, wherein each left and right level sensor is integrated in the left and right shock absorber, respectively.

In an example of the vehicle, at least one of the left and right level sensor is an eddy current based linear position sensor.

In an example of the vehicle, the inertial measurement unit comprises an accelerometer, a gyroscope and/or a magnetometer.

In an example of the vehicle, each leaf spring has an elongated shape and extends in a direction substantially in parallel with the longitudinal roll axis of the vehicle.

In an example of the vehicle, each leaf spring is connected to the chassis at a first point in front of the corresponding wheel and at a second point behind the corresponding wheel with reference to a front and rear of the vehicle.

In an example of the vehicle, the control circuitry forms part of or is connected to a vehicle control system configured to control a speed of the vehicle, wherein the vehicle control system is configured to reduce the speed of the vehicle and/or stop the vehicle as a response to the leaf spring failure alarm signal.

In an example of the vehicle, the vehicle is a heavy commercial vehicle, such as a mining dumper, truck or articulated hauler.

According to a third aspect of the disclosure it concerns a method for operating a vehicle according to above, the method comprising:

comparing the signals on current vertical position obtained from the left and right level sensors and determine whether a current difference in vertical position between the left and right leaf springs is greater than a first threshold value;

if the determined difference is greater than the first threshold value:
   determining, based on timing information related to the signals provided by the inertial measurement unit and the left and right level sensors, whether the determined difference in vertical position between the left and right leaf springs is related in time with a signal from the inertial measurement unit indicating that the angular velocity of the wheel axle is greater than a second threshold;

and, if the determined difference in vertical position is not related in time with the signal indicating that the angular velocity of the wheel axle is greater than the second threshold,
   generating an alarm signal indicative of a detected or possibly detected leaf spring failure.

According to a fourth aspect of the disclosure it concerns a control circuitry for controlling a vehicle according to above, the control circuitry being configured to perform the method according to above.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of examples of the disclosure cited as examples.

DETAILED DESCRIPTION

Aspects set forth below represent the necessary information to enable those skilled in the art to practice the disclosure.

Figure 1:
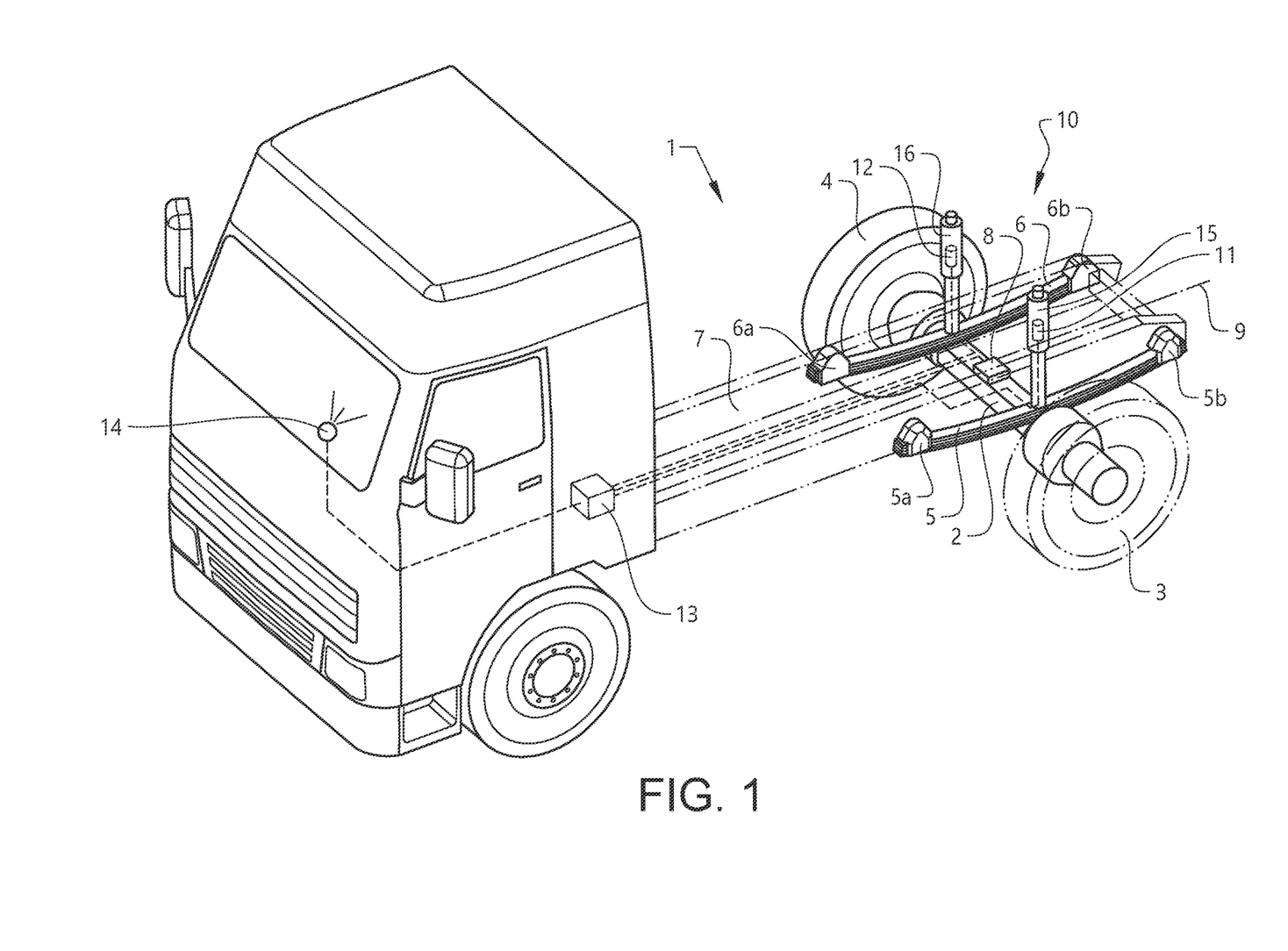
FIG. 1 shows a schematic example of a vehicle provided with a suspension system according to this disclosure.

FIG. 1 shows a vehicle 1 comprising a chassis 7, a pair of left and right (rear) wheels 3, 4 and a suspension system 10 for connecting the wheels 3, 4 and the chassis 7. A wheel axle 2 extends transversely across the vehicle 1 and is connected at the end portions thereof to the left and right wheels 3, 4. A pair of left and right leaf springs 5, 6 are connected to the wheel axle 2 in association with a corresponding wheel 3, 4. Each leaf spring 5, 6 has an elongated shape and extends in a direction substantially in parallel with a longitudinal roll axis 9 of the vehicle 1. Further, each leaf spring 5, 6 is connected to the chassis 7 at a first point 5a, 6a in front of the corresponding wheel 3, 4 and at a second point 5b, 6b behind the corresponding wheel 3, 4 with reference to a front and rear of the vehicle 1. The second (rear) connection point 5b, 6b includes a shackle (not shown) allowing the rear part of the corresponding leaf spring 5, 6 to move in the longitudinal direction of the vehicle 1 when the leaf spring is further bent or straightened out. While deflecting, the leaf springs 5, 6 allow relative vertical movement between the chassis 7 and the wheel axle 2 and thereby also between the chassis 7 and the wheels 3, 4.

An inertial measurement unit 8 (IMU) is arranged at a central part of the wheel axle 2. The IMU 8 comprises an accelerometer, a gyroscope and/or a magnetometer and is thus adapted to provide a signal indicative of a current angular velocity of the wheel axle 2 about the longitudinal roll axis 9 of the vehicle 1. The IMU is thus adapted to provide information on whether one of the wheels 3, 4 passes a significant bump or pothole on a road surface while driving the vehicle 1.

The suspension system 10 further comprises left and right shock absorbers 15, 16 arranged to be compressed when the vertical distance between the chassis 7 and the wheel axle 2 decreases. In the example shown in FIG. 1, a lower end part of each shock absorber 15, 16 is connected to the axle 2 via its corresponding leaf spring 5, 6. An upper end part of each shock absorber 15, 16 is connected to the chassis via a not shown connection arrangement.

Left and right level sensor 11, 12 are integrated in the left and right shock absorber 15, 16, respectively. The level sensors 11, 12 are arranged to provide a signal indicative of a current vertical position of the corresponding leaf spring 5, 6 in relation to the chassis 7. The level sensors are thus adapted to provide information on a degree of deflection of each of the left and right leaf springs 5, 6 when functioning as intended. 8. Each of the left and right level sensor 11, 12 is in this case an eddy current based linear position sensor.

The vehicle 1 further comprises a control circuitry 13 configured to control the suspension system 10. In this example the control circuitry 13 forms part of a vehicle control system configured to control, for instance, a speed of the vehicle 1. In particular, the vehicle control system is configured to reduce the speed of the vehicle 1 and/or stop the vehicle 1 as a response to a leaf spring failure alarm signal as will be described below. The control circuit 13, and/or the vehicle control system, may also or alternatively be configured to activate an alarm light 14 on the driver instrument panel, or activate some other alarm, when detecting a leaf spring failure.

The control circuitry 13 is configured to:
   compare the signals on current vertical position obtained from the left and right level sensors 11, 12 and determine whether a current difference in vertical position between the left and right leaf springs 5, 6 is greater than a first threshold value;

if the determined difference is greater than the first threshold value:
   determine, based on timing information related to the signals provided by the inertial measurement unit 8 and the left and right level sensors 11, 12, whether the determined difference in vertical position between the left and right leaf springs 5, 6 is related in time with a signal from the inertial measurement unit 8 indicating that the angular velocity of the wheel axle 2 is greater than a second threshold;

and, if the determined difference in vertical position is not related in time with the signal indicating that the angular velocity of the wheel axle 2 is greater than the second threshold,
   generate an alarm signal indicative of a detected or possibly detected leaf spring failure.

If the determined difference in vertical position is related in time with the signal indicating that the angular velocity of the wheel axle 2 is greater than the second threshold, it suggests that one of the wheels 3, 4 has hit a bump or pothole rather than that a leaf spring failure has occurred, and in that case no alarm signal is generated.

As indicated above, a response to the leaf spring failure alarm signal may be to automatically checking the speed of the vehicle and reduce the speed by applying a braking system if the speed is greater than a certain threshold speed.

Figure 2:
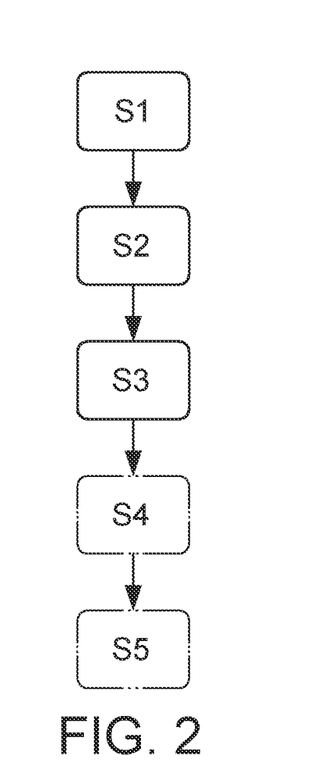
FIG. 2 shows a flow diagram for an example of a method according to this disclosure.

An example of a method for operating the vehicle 1 comprises the following steps:

S1: comparing the signals on current vertical position obtained from the left and right level sensors 11, 12 and determine whether a current difference in vertical position between the left and right leaf springs 5, 6 is greater than a first threshold value;

if the determined difference is greater than the first threshold value:

S2: determining, based on timing information related to the signals provided by the inertial measurement unit 8 and the left and right level sensors 11, 12, whether the determined difference in vertical position between the left and right leaf springs 5, 6 is related in time with a signal from the inertial measurement unit 8 indicating that the angular velocity of the wheel axle 2 is greater than a second threshold;

and, if the determined difference in vertical position is not related in time with the signal indicating that the angular velocity of the wheel axle 2 is greater than the second threshold, S3: generating an alarm signal indicative of a detected or possibly detected leaf spring failure.

The method may further comprise the steps of:

S4: checking the speed of the vehicle, and

S5: reducing the speed of the vehicle 1 by applying a vehicle braking system if the speed is greater than a certain threshold speed.

Figure 3:
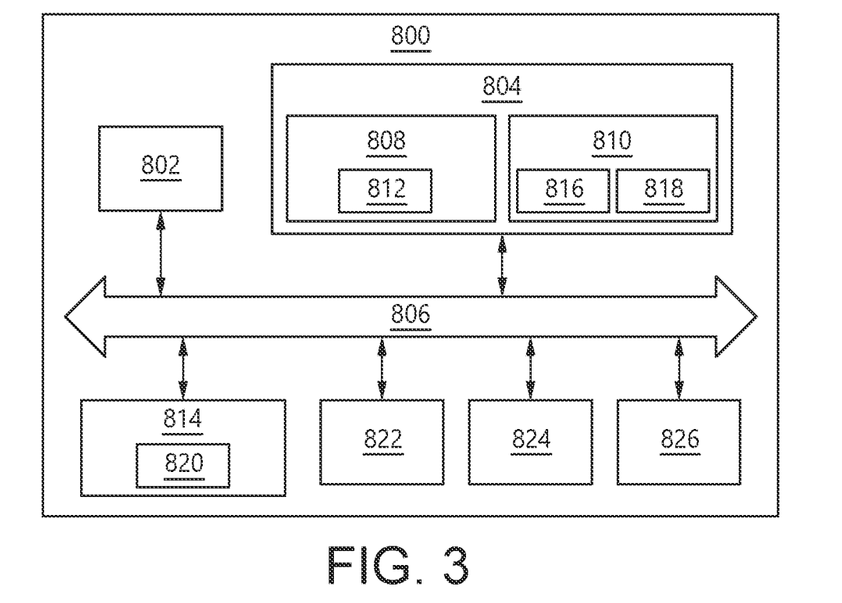
FIG. 3 is a schematic diagram of an exemplary computer system for implementing examples disclosed herein, according to one example.

FIG. 3 is a schematic diagram of a computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or executing software instructions to implement the functionality described herein. The computer system 800 may include a processor device 802 (may also be referred to as a control unit or the control circuitry 13), a memory 804, and a system bus 806. The computer system 800 may include at least one computing device having the processor device 802. The system bus 806 provides an interface for system components including, but not limited to, the memory 804 and the processor device 802. The processor device 802 may include any number of hardware components for conducting data or signal processing or for executing computer code stored in memory 804. The processor device 802 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processor device 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with a processor device 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program product 820 stored on a transitory or non-transitory computer-usable or computer-readable storage medium (e.g., single medium or multiple media), such as the storage device 814, which includes complex programming instructions (e.g., complex computer-readable program code) to cause the processor device 802 to carry out the steps described herein. Thus, the computer-readable program code can comprise software instructions for implementing the functionality of the examples described herein when executed by the processor device 802. The processor device 802 may serve as a controller or control system for the computer system 800 that is to implement the functionality described herein.

The computer system 800 also may include an input device interface 822 (e.g., input device interface and/or output device interface). The input device interface 822 may be configured to receive input and selections to be communicated to the computer system 800 when executing instructions, such as from a keyboard, mouse, touch-sensitive surface, the sensors 8, 11, 12, etc. Such input devices may be connected to the processor device 802 through the input device interface 822 coupled to the system bus 806 but can be connected through other interfaces such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may also include a communications interface 826 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

Further aspects of this disclosure include the following points:

1. A computer system comprising a processor device configured to:
   compare the signals (or messages or information) on current vertical position obtained from the left and right level sensors (11, 12) and determine whether a current difference in vertical position between the left and right leaf springs (5, 6) is greater than a first threshold value;
   if the determined difference is greater than the first threshold value:
   determine, based on timing information related to the signals (or messages or information) provided by the inertial measurement unit (8) and the left and right level sensors (11, 12), whether the determined difference in vertical position between the left and right leaf springs (5, 6) is related in time with a signal (or message or information) from the inertial measurement unit (8) indicating that the angular velocity of the wheel axle (2) is greater than a second threshold;
   and, if the determined difference in vertical position is not related in time with the signal (or message or information) indicating that the angular velocity of the wheel axle (2) is greater than the second threshold;
   generate an alarm signal (or message or information) indicative of a detected or possibly detected leaf spring failure.

2. A computer-implemented method, comprising:
   (S1) comparing, by a processor device of a computer system, the signals (or messages or information) on current vertical position obtained from the left and right level sensors (11, 12) and determine whether a current difference in vertical position between the left and right leaf springs (5, 6) is greater than a first threshold value;

if the determined difference is greater than the first threshold value:

(S2) determining, by the processor device and based on timing information related to the signals (or messages or information) provided by the inertial measurement unit (8) and the left and right level sensors (11, 12), whether the determined difference in vertical position between the left and right leaf springs (5, 6) is related in time with a signal (or message or information) from the inertial measurement unit (8) indicating that the angular velocity of the wheel axle (2) is greater than a second threshold;

and, if the determined difference in vertical position is not related in time with the signal (or message or information) indicating that the angular velocity of the wheel axle (2) is greater than the second threshold, (S3) generating, by the processor device, an alarm signal (or message or information) indicative of a detected or possibly detected leaf spring failure.

3. The method of point 2, further comprising:

(S4): checking, by the processor device, the speed of the vehicle, and (S5): reducing the speed of the vehicle 1 by applying, by the processor device, a vehicle braking system if the speed is greater than a certain threshold speed.

4. A vehicle comprising the processor device to perform the method of any of points 2-3.

5. A computer program product comprising program code for performing, when executed by the processor device, the method of any of points 2-3.

6. A control system comprising one or more control units configured to perform the method of any of points 2-3.

7. A non-transitory computer-readable storage medium comprising instructions, which when executed by the processor device, cause the processor device to perform the method of any of points 2-3.

The invention claimed is:

1. A suspension system for a heavy vehicle, the system comprising:
  a wheel axle configured to extend transversely across the vehicle and be connected to a pair of left and right wheels of the vehicle;
  a pair of left and right leaf springs connected to the wheel axle in association with a corresponding wheel; wherein each leaf spring is adapted to be connected also to a chassis of the vehicle so as to, while deflecting, allow relative vertical movement between the chassis and the wheel axle;
  an inertial measurement unit arranged at the wheel axle, wherein the inertial measurement unit is adapted to provide a signal indicative of a current angular velocity of the wheel axle about a longitudinal roll axis of the vehicle and thus to provide information on whether one of the wheels passes a significant bump on a road surface while driving the vehicle;
  left and right level sensors arranged to provide a signal indicative of a current vertical position of a corresponding leaf spring in relation to the chassis and thus to provide information on a degree of deflection of each of the left and right leaf springs when functioning as intended; and
  a control circuitry configured to control the suspension system, wherein the control circuitry is configured to:
    compare the signals on current vertical position obtained from the left and right level sensors and determine whether a current difference in vertical position between the left and right leaf springs is greater than a first threshold value;
    when the determined difference is greater than the first threshold value:
      determine, based on timing information related to the signals provided by the inertial measurement unit and the left and right level sensors, whether the determined difference in vertical position between the left and right leaf springs is related in time with a signal from the inertial measurement unit indicating that the angular velocity of the wheel axle is greater than a second threshold; and
    when the determined difference in vertical position is not related in time with the signal indicating that the angular velocity of the wheel axle is greater than the second threshold:
      generate an alarm signal indicative of a detected or possibly detected leaf spring failure.

2. The suspension system of claim 1, wherein the suspension system further comprises left and right shock absorbers arranged to be compressed when the vertical distance between the chassis and the wheel axle decreases, wherein each left and right level sensor is integrated in the left and right shock absorber, respectively.

3. The suspension system of claim 1, wherein at least one of the left and right level sensor is an eddy current based linear position sensor.

4. The suspension system of claim 1, wherein the inertial measurement unit comprises an accelerometer, a gyroscope, and/or a magnetometer.

5. The suspension system of claim 1, wherein each leaf spring has an elongated shape and extends in a direction substantially in parallel with the longitudinal roll axis of the vehicle.

6. A vehicle comprising a chassis, a pair of left and right wheels and a suspension system for connecting the wheels and the chassis, wherein the suspension system comprises:
  a wheel axle that extends transversely across the vehicle and that is connected at the end portions thereof to the left and right wheels;
  a pair of left and right leaf springs connected to the wheel axle in association with a corresponding wheel, wherein each leaf spring is connected also to the chassis so as to, while deflecting, allow relative vertical movement between the chassis and the wheel axle and thereby also between the chassis and the wheels;
  an inertial measurement unit arranged at the wheel axle, wherein the inertial measurement unit is adapted to provide a signal indicative of a current angular velocity of the wheel axle about a longitudinal roll axis of the vehicle and thus to provide information on whether one of the wheels passes a significant bump on a road surface while driving the vehicle; and
  left and right level sensors arranged to provide a signal indicative of a current vertical position of a corresponding leaf spring in relation to the chassis and thus to provide information on a degree of deflection of each of the left and right leaf springs when functioning as intended;
  wherein the vehicle further comprises:
    a control circuitry configured to control the suspension system, wherein the control circuitry is configured to:
      compare the signals on current vertical position obtained from the left and right level sensors and determine whether a current difference in vertical position between the left and right leaf springs is greater than a first threshold value;

when the determined difference is greater than the first threshold value:

determine, based on timing information related to the signals provided by the inertial measurement unit and the left and right level sensors, whether the determined difference in vertical position between the left and right leaf springs is related in time with a signal from the inertial measurement unit indicating that the angular velocity of the wheel axle is greater than a second threshold; and when the determined difference in vertical position is not related in time with the signal indicating that the angular velocity of the wheel axle is greater than the second threshold:

generate an alarm signal indicative of a detected or possibly detected leaf spring failure.

7. The vehicle of claim 6, wherein the suspension system further comprises left and right shock absorbers arranged to be compressed when the vertical distance between the chassis and the wheel axle decreases, wherein each left and right level sensor is integrated in the left and right shock absorber, respectively.

8. The vehicle of claim 6, wherein at least one of the left and right level sensor is an eddy current based linear position sensor.

9. The vehicle of claim 6, wherein the inertial measurement unit comprises an accelerometer, a gyroscope and/or a magnetometer.

10. The vehicle of claim 6, wherein each leaf spring has an elongated shape and extends in a direction substantially in parallel with the longitudinal roll axis of the vehicle.

11. The vehicle of claim 6, wherein each leaf spring is connected to the chassis at a first point in front of the corresponding wheel and at a second point behind the corresponding wheel with reference to a front and rear of the vehicle.

12. The vehicle of claim 6, wherein the control circuitry forms part of or is connected to a vehicle control system configured to control a speed of the vehicle, wherein the vehicle control system is configured to reduce the speed of the vehicle and/or stop the vehicle as a response to the leaf spring failure alarm signal.

13. The vehicle of claim 6, wherein the vehicle is a heavy commercial vehicle, such as a mining dumper, truck or articulated hauler.

14. A method for operating the vehicle of claim 6, the method comprising:

comparing the signals on current vertical position obtained from the left and right level sensors and determine whether a current difference in vertical position between the left and right leaf springs is greater than a first threshold value;

when the determined difference is greater than the first threshold value:

determining, based on timing information related to the signals provided by the inertial measurement unit and the left and right level sensors, whether the determined difference in vertical position between the left and right leaf springs is related in time with a signal from the inertial measurement unit indicating that the angular velocity of the wheel axle is greater than a second threshold; and when the determined difference in vertical position is not related in time with the signal indicating that the angular velocity of the wheel axle is greater than the second threshold:

generating an alarm signal indicative of a detected or possibly detected leaf spring failure.

15. A control circuitry for controlling the vehicle of claim 6, the control circuitry being configured to perform a method for operating the vehicle comprising:

comparing the signals on current vertical position obtained from the left and right level sensors and determine whether a current difference in vertical position between the left and right leaf springs is greater than a first threshold value;

when the determined difference is greater than the first threshold value:

determining, based on timing information related to the signals provided by the inertial measurement unit and the left and right level sensors, whether the determined difference in vertical position between the left and right leaf springs is related in time with a signal from the inertial measurement unit indicating that the angular velocity of the wheel axle is greater than a second threshold; and when the determined difference in vertical position is not related in time with the signal indicating that the angular velocity of the wheel axle is greater than the second threshold:

generating an alarm signal indicative of a detected or possibly detected leaf spring failure.

* * * * *